United States Patent
Dietrich et al.

(10) Patent No.: US 6,842,260 B2
(45) Date of Patent: Jan. 11, 2005

(54) IMAGING SYSTEM AND METHOD FOR POSITIONING A MEASURING TIP ONTO A CONTACT REGION OF A MICROCHIP

(75) Inventors: Stefan Dietrich, Türkenfeld (DE); Manfred Dobler, München (DE); Thilo Marx, Villingen-Schwenningen (DE); Peter Mayer, München (DE)

(73) Assignee: Infineon Technologies AG, Munich (DE)

(*) Notice: Subject to any disclaimer, the term of this patent is extended or adjusted under 35 U.S.C. 154(b) by 70 days.

(21) Appl. No.: 10/156,538

(22) Filed: May 28, 2002

(65) Prior Publication Data

US 2002/0176095 A1 Nov. 28, 2002

(30) Foreign Application Priority Data

May 26, 2001 (DE) .......................... 101 25 798

(51) Int. Cl.[7] .............................. G01B 11/14
(52) U.S. Cl. ................. 356/614; 250/216; 324/757
(58) Field of Search .................. 356/602–609, 356/614–624; 250/306–307, 234, 216, 201.1, 201.3; 324/750, 754, 96, 757–758; 73/105; 382/151

(56) References Cited

U.S. PATENT DOCUMENTS

| | | | | |
|---|---|---|---|---|
| 4,929,893 A | * | 5/1990 | Sato et al. ................. 324/758 |
| 5,184,162 A | * | 2/1993 | Saitoh et al. ............. 324/158.1 |
| 5,254,854 A | * | 10/1993 | Betzig ........................ 250/234 |
| 5,288,996 A | * | 2/1994 | Betzig et al. .......... 250/227.26 |
| 5,298,975 A | * | 3/1994 | Khoury et al. ............... 356/624 |
| 5,331,275 A | * | 7/1994 | Ozaki et al. ................. 324/757 |
| 5,394,100 A | * | 2/1995 | Bohler et al. ............... 324/758 |
| 5,548,113 A | * | 8/1996 | Goldberg et al. ........... 250/234 |
| 5,675,075 A | * | 10/1997 | Arnold et al. ................. 73/105 |
| 5,681,987 A | * | 10/1997 | Gamble ....................... 73/105 |
| 5,874,726 A | * | 2/1999 | Haydon .................... 250/201.1 |
| 5,939,709 A | * | 8/1999 | Ghislain et al. ............. 250/216 |
| 5,999,005 A | * | 12/1999 | Fujii et al. .................. 324/750 |
| 6,178,813 B1 | * | 1/2001 | Bruno et al. ................... 73/105 |
| 6,208,375 B1 | * | 3/2001 | Kay et al. ..................... 348/95 |
| 6,546,788 B2 | * | 4/2003 | Magerle ....................... 73/105 |

FOREIGN PATENT DOCUMENTS

| | | | | |
|---|---|---|---|---|
| DE | 3502388 A | * | 9/1985 | ........... G01B/11/00 |
| DE | 40 09 947 A1 | | 10/1991 | |
| EP | 0 433 604 B1 | | 6/1991 | |
| JP | 09 264 435 | * | 1/1997 | |

* cited by examiner

*Primary Examiner*—Zandra V. Smith
*Assistant Examiner*—Sang H. Nguyen
(74) *Attorney, Agent, or Firm*—Laurence A. Greenberg, P.A.; Werner H. Stemer; Gregory L. Mayback

(57) ABSTRACT

The imaging system provides assistance during the positioning of a measuring tip as it is placed onto a contact region of a microchip, in order to measure an on-chip signal. The contact region is imaged in a magnified fashion. An insertion device is provided that is suitable for providing a display of the on-chip signal in the imaging plane.

10 Claims, 2 Drawing Sheets

IMAGING SYSTEM AND METHOD FOR POSITIONING A MEASURING TIP ONTO A CONTACT REGION OF A MICROCHIP

BACKGROUND OF THE INVENTION

Field of the Invention

The invention relates to an imaging system for positioning a measuring tip during emplacement onto a contact region of a microchip, and for displaying a signal measured there, having an imaging plane wherein the contact region is imaged in a magnified fashion.

During the analysis of microchips, in particular during prototype production, it is often necessary to sample on-chip signals, i.e. signals which cannot be tapped off at a contact area provided therefor, with the aid of measuring tips. In this case, the contact region of the measuring tip is emplaced onto an interconnect which is uncovered on the microchip, with the result that an electrical contact is produced. To that end, the measuring tip must be emplaced on the measuring area in an accuracy range of a few micrometers and the behavior of the signal must be observed by means of a measuring unit that is connected to the measuring tip. The emplacement must be effected carefully since the interconnect is not permitted to be destroyed, i.e. interrupted, by the measuring tip.

Due to the very small dimensions of the measuring regions on the microchips, e.g. of interconnects, the measuring unit must be observed during the adjusting and contact-connecting operation since it is not possible for the quality of the contact produced between measuring tip and measuring region to be assessed optically by way of the microscope. This is a highly time-consuming operation since one is either forced to continually look back and forth between the microscope and the measuring unit or one needs an assistant who observes the measuring unit and signals as soon as the contact connection has been effected.

SUMMARY OF THE INVENTION

It is accordingly an object of the invention to provide an imaging system for positioning a measuring tip on a contact region, which overcomes the above-mentioned disadvantages of the heretofore-known devices and methods of this general type and which provides a device with which the contact connection of measuring regions on microchips can be facilitated and with which it is possible to reduce the time spent on contact connection.

With the foregoing and other objects in view there is provided, in accordance with the invention, a system for positioning a measuring tip onto a contact region and for measuring a signal at the contact region with a measuring unit, an imaging system, comprising:

a display device having an imaging plane and a device for imaging the contact region onto said imaging plane in a magnified fashion;

an insertion device connected to the measuring unit for displaying the signal measured with the measuring tip in said imaging plane.

In accordance with an added feature of the invention, the measuring tip is configured to measure a microscopic contact region on a microchip.

In other words, the invention provides an imaging system for positioning of a measuring tip during emplacement onto a contact region of a microchip, in order to measure an on-chip signal. The imaging system has an imaging plane, wherein the contact region is imaged in a magnified fashion. Furthermore, an insertion device is provided which is suitable for providing a display of the on-chip signal in the imaging plane.

With the aid of the invention, it is possible to display measuring tip, contact region and also signal or signal profile on the same imaging plane, either by superposition of the images or by adjacent imaging. As a result, when making contact between the contact region and the measuring tip, there is no need to carry out a time-consuming change of view in order to measure the quality of the contact connection. Rather, it is possible that a user, by means of operating elements, emplaces the measuring tip onto the contact region and can simultaneously observe the signal profile, so that it can be discerned from the signal profile when the contact region has been successfully contact-connected by the measuring tip. Combining two hitherto spatially separate optical planes onto one common imaging plane thus makes it possible to display information about the present position of the measuring tip with regard to the contact region at the same time as a signal from which the quality of the contact connection can be discerned or it can be discerned whether the contact connection has been effected.

In accordance with an additional feature of the invention, the imaging system is an optical imaging system. Preferably, insertion device includes a transparent display device for displaying the signal measured with the measuring tip arranged in a beam path of the optical imaging system. The transparent display device may be disposed to image the display of the signal measured with the measuring tip onto the contact region.

In a preferred embodiment of the invention, the imaging system has an eyepiece and/or an objective (lens).

In accordance with another feature of the invention, the display is configured to indicate a quality of a contact formed between the emplaced measuring tip and the contact region.

In accordance with a further feature of the invention, the display of the signal measured with the measuring tip in the imaging plane is configured to display a temporal profile of the signal.

With the above and other objects in view there is also provided, in accordance with the invention, a display method, which comprises:

placing a measuring tip on a contact region;

measuring the contact region with the measuring tip and generating a measurement signal; and displaying the measurement signal and the contact region in an imaging plane.

In accordance with a concomitant feature of the invention, the contact region is on a microchip and the measurement signal and the contact region (in magnified fashion) are displayed on a single imaging plane.

It is preferably provided that the imaging system is an optical imaging system, the insertion device having a transparent display device which is arranged in a beam path of the optical imaging system. The optical imaging system preferably has an eyepiece and an objective, between which the transparent display device is arranged. It is now possible, on the one hand, to use the transparent display device to image the displayed signal with the aid of the objective onto the contact region of the microchip. The image displayed there is then imaged together with the contact region via objective and eyepiece on the imaging plane. On the other hand, it is possible to use the transparent display device to image, with the aid of the eyepiece, the signal displayed on the transparent display device onto the imaging plane. The transparent display device is preferably arranged in an intermediate image plane between eyepiece and objective, so that the signal displayed on the transparent display device is clearly displayed on the imaging plane.

The insertion device is preferably configured in such a way as to display, in a suitable manner, the quality of the contact formed between the emplaced measuring tip and the contact region. In particular, it is possible in this way to discern poor contact connections on account of a high contact resistance, a Schottky contact formed between contact region and measuring tip, or similar effects. In particular, it is advantageous to configure the display in such a way that the profile of the signal is displayed. Consequently, it is preferred to display an oscilloscope display by means of the transparent display device, so that it is possible to read the quality of the contact connection on the basis of quantity and quality of the signal or the profile thereof.

Other features which are considered as characteristic for the invention are set forth in the appended claims.

Although the invention is illustrated and described herein as embodied in an imaging system for positioning a measuring tip onto a contact region of a microchip, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
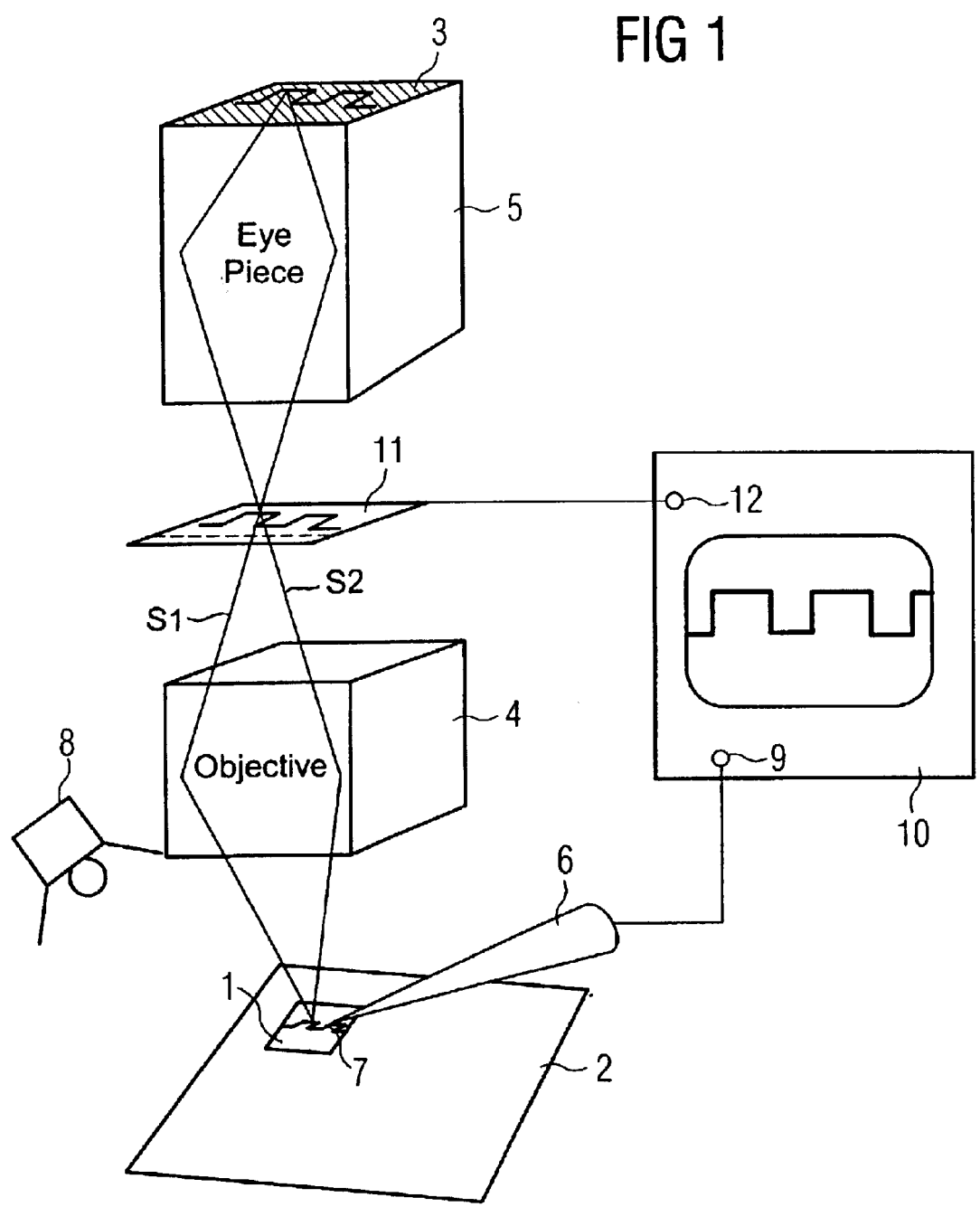
FIG. 1 is a diagrammatic illustration of an optical imaging system in accordance with a first embodiment of the invention.

Referring now to the figures of the drawing in detail and first, particularly, to FIG. 1 thereof, there is shown an optical imaging system in accordance with a preferred embodiment of the invention. The optical imaging system images a region 1 on a chip 2, wherein a contact region to be contact is situated, in an imaging plane 3. The imaging system has an objective 4 (also referred to as a lens 4) and an eyepiece 5. With the aid of the objective 4 and the eyepiece 5, the region 1 that is to be imaged on the chip 2 is imaged onto the imaging plane 3 in an optically magnified fashion. The magnification results from the optical properties of the objective 4 and the eyepiece 5 and also their arrangement with respect to one another.

A measuring tip 6 is arranged above the chip 2 in such a way that the contact-connection region of the measuring tip 6 is approximately arranged above the region 1 of the chip 2 and appears on the imaging plane 3. With the aid of a non-illustrated positioning device for the measuring tip 6, the measuring tip 6 is moved over the region 1 of the chip 2 in such a way that it is situated perpendicularly above the contact region 7 to be contact-connected in the region 1 to be imaged. The contact region 7 to be contact-connected is covered by the measuring tip 6 because the measuring tip 6 is situated in the beam path between imaging plane 3 and region 1. Consequently, it cannot be discerned on the imaging plane 3 when the measuring tip 6 touches the contact region 7. For the illumination of contact region 7, measuring tip 6 and region 1 to be imaged, provision is made of a light source 8 which is arranged laterally with respect to the beam path and radiates towards the chip 2.

The measuring tip 6 is electrically connected to a signal input 9 of an oscilloscope 10. The oscilloscope 10 has a data output 12, which is designed as a transparent imaging device 11. The transparent imaging device 11 is arranged between the eyepiece 5 and the objective 4 in an intermediate image plane, so that the output displayed on the transparent display device 11 is imaged in the imaging plane 3 with the aid of light reflected from the region 1 to be imaged and of the eyepiece 5. Thus, the output of the display device 11 is superimposed on the image of the region 1 on the imaging plane 3.

The beam path through objective 4 and eyepiece 5 is diagrammatically illustrated by beams S1 and S2. The intermediate image plane is a plane between objective 4 and eyepiece 5, at which the beams S1 and S2 intersect, the position of the intermediate image plane with regard to the objective 4 depending on the refractive power of the objective 4 and the distance of the objective 4 from the region 1 to be imaged on the chip 2.

Figure 2:
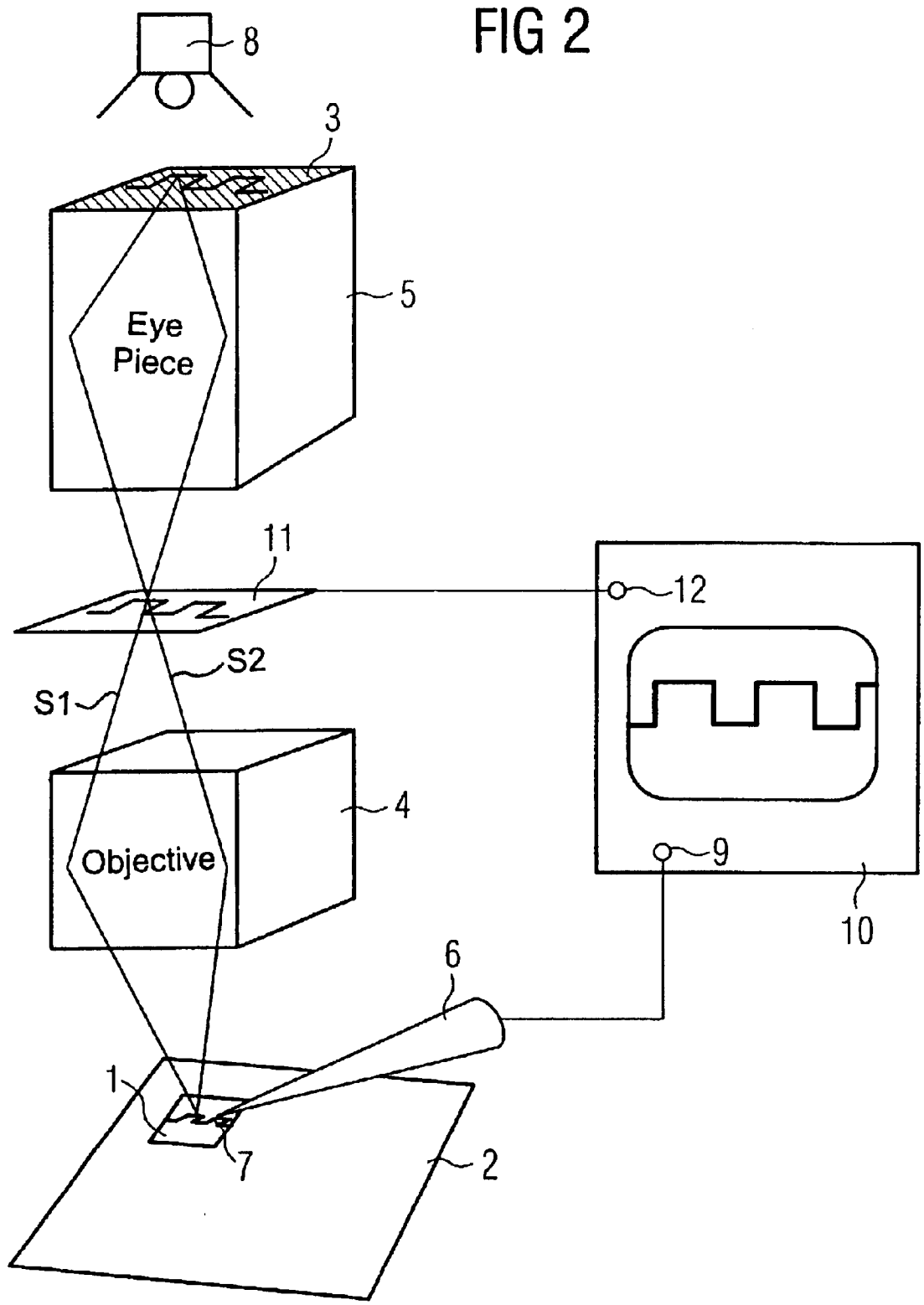
FIG. 2 is a diagrammatic illustration of an optical imaging system in accordance with a second embodiment of the invention.

FIG. 2 shows a diagrammatic illustration of a second embodiment of the invention. In this case, elements bearing the same reference symbols represent identical or essentially functionally identical components.

In the embodiment of FIG. 2, the transparent display device 11 is used not to project the image directly onto the imaging plane 3 but rather firstly to image it onto the region 1 of the chip 2 that is to be imaged. In this case, the surface of the chip 2 serves as imaging plane for the signal displayed on the transparent display device 11. The light source 8 is then arranged in the beam path, i.e. along the optical axis of eyepiece 5 and objective 4 above the display device 11. The image projected onto the region 1 is then imaged via objective 4 and eyepiece 5 onto the imaging plane 3.

In the embodiment illustrated, the transparent display device 11 is situated in the beam path between objective 4 and eyepiece 5, but it is also possible that, in this embodiment, the transparent display device 11 is situated outside said beam path and the signal profile to be displayed is imaged e.g. laterally onto the region 1 to be imaged, wherein region the contact region 7 to be contact-connected is situated. However, care must then be taken to ensure that the measuring tip 6 is arranged in such a way that it does not cast a disturbing shadow on the region 1 to be imaged.

The imaging device is not restricted to two optical imaging elements, such as objective 4 and eyepiece 5. It is also possible to use further optical elements, e.g. prisms and further lenses, in the imaging system.

Preferably, for displaying the signal, a transparent display device 11 is provided, which can be used to display a signal profile. The signal profile shows the observer a signal which is tapped off on the chip 2 at the contact region 7, the shape of the signal providing an indication of the quality of the contact connection. However, it may also be provided that the quality of the contact connection is evaluated automatically, and the contact connection effected and also the quality of the contact connection takes place via e.g. a light-emitting diode display which is integrated into the beam path of the imaging system. In other words, an optical signal is emitted if the contact connection was successful and/or the contact connection has not been effected.

It goes without saying that the imaging system can also be an electronic imaging system, the region 1 to be imaged being detected by an electronic camera and being transmitted in a magnified fashion to a screen. The signal profile and the display for representing the contact-connection quality are then displayed on a single screen display. This can be done for example alongside one another or in a superposing manner or the like.

There are many different conceivable configurations which enable the user to display both the region on the chip wherein the contact point is situated, the end of the measuring tip 6 that is to be emplaced and the signal profile of the tapped off signal at the contact point 7 simultaneously in a field of view. It is thus evident to the person skilled in the art that there are many configurations and realization possibilities which all lie within the scope of the invention.

We claim:

1. In a system for positioning a measuring tip onto a contact region and for measuring a signal at the contact region with a measuring unit, an imaging system, comprising:
    a display device having an imaging plane, said display device being an eyepiece through which a user receives an image of the contact region on which the measuring tip is placed;
    a device for imaging the contact region onto said imaging plane in a magnified fashion; and
    an insertion device connected to the measuring unit for displaying a representation of the signal measured with the measuring tip in said imaging plane.

2. The imaging system according to claim 1, wherein the measuring tip is configured to measure a microscopic contact region on a microchip.

3. The imaging system according to claim 1, wherein the imaging system is formed as an optical imaging system.

4. The imaging system according to claim 3, wherein said insertion device includes a transparent display device for displaying the signal measured with the measuring tip arranged in a beam path of the optical imaging system.

5. The imaging system according to claim 4, wherein said transparent display device is disposed to image the display of the signal measured with the measuring tip onto the contact region.

6. The imaging system according to claim 1, wherein said device for imaging the contact region onto said imaging plane is an objective.

7. The imaging system according to claim 1, wherein the display is configured to indicate a quality of a contact formed between the emplaced measuring tip and the contact region.

8. The imaging system according to claim 1, wherein the display of the signal measured with the measuring tip in the imaging plane is configured to display a temporal profile of the signal.

9. A display method, which comprises:
    placing a measuring tip on a contact region;
    measuring the contact region with the measuring tip and generating a measurement signal;
    providing an imaging system, including:
        a display device having an imaging plane, the display device being an eyepiece through which a user receives an image of the contact region on which the measuring tip is placed;
        a device for imaging the contact region onto the imaging plane in a magnified fashion; and
        an insertion device connected to a measuring unit for displaying a representation of the signal measured with the measuring tip in the imaging plane; and
    displaying the measurement signal and the contact region in the common imaging plane.

10. The display method according to claim 9, wherein the contact region is a contact region on a microchip and the measurement signal is displayed in magnified fashion on a single imaging plane.

* * * * *